(12) United States Patent
Lindoff

(10) Patent No.: US 6,449,320 B1
(45) Date of Patent: Sep. 10, 2002

(54) EQUALIZATION WITH DC-OFFSET COMPENSATION

(75) Inventor: Bengt Lindoff, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/347,230

(22) Filed: Jul. 2, 1999

(51) Int. Cl.⁷ .............................................. H04L 25/06
(52) U.S. Cl. .................... 375/319; 375/231; 375/346; 455/296
(58) Field of Search ................. 375/231, 232, 375/262, 265, 316, 317, 319, 340, 341, 346, 348, 350; 714/792, 794, 795, 796; 455/296

(56) References Cited

U.S. PATENT DOCUMENTS

| | | | |
|---|---|---|---|
| 5,091,918 A | | 2/1992 | Wales |
| 5,241,320 A | | 8/1993 | Mizoguchi |
| 5,241,702 A | * | 8/1993 | Dent ........................ 455/278.1 |
| 5,319,679 A | * | 6/1994 | Bagby ........................ 375/354 |
| 5,396,517 A | | 3/1995 | Yedid et al. |
| 5,442,655 A | | 8/1995 | Dedic et al. |
| 5,572,547 A | | 11/1996 | Citta et al. |
| 5,648,987 A | | 7/1997 | Yang et al. |
| 5,724,653 A | * | 3/1998 | Baker et al. ................. 455/296 |
| 5,748,681 A | * | 5/1998 | Comino et al. ............. 375/319 |
| 5,754,595 A | * | 5/1998 | Honkasalo et al. ......... 375/286 |
| 5,886,748 A | * | 3/1999 | Lee ............................ 348/614 |
| 6,192,238 B1 | * | 2/2001 | Piirainen .................... 455/422 |
| 6,269,131 B1 | * | 7/2001 | Gothe et al. ................ 375/346 |
| 6,311,051 B1 | * | 10/2001 | Jung .......................... 455/296 |
| 6,327,315 B1 | * | 12/2001 | Piirainen .................... 375/340 |
| 6,370,205 B1 | * | 4/2002 | Lindoff et al. .............. 375/319 |

FOREIGN PATENT DOCUMENTS

| | | |
|---|---|---|
| DE | 19606102 A1 | 8/1997 |
| EP | 0 474 615 A2 * | 3/1992 |
| GB | 2 267 629 A * | 12/1993 |
| JP | 1173912 A | 7/1989 |
| JP | 8331017 A | 12/1996 |
| WO | 94/10757 A1 | 5/1994 |
| WO | WO98/25351 | 6/1998 |
| WO | WO01/03395 A1 * | 1/2001 |

OTHER PUBLICATIONS

D. L. Lyon, "Elimination of DC Offset by MMSE Adaptive Equalizers," IEEE Transactions on Communications, vol. 24, No. 9, Sep. 1976, pp. 1049–1054.

* cited by examiner

Primary Examiner—Young T. Tse
(74) Attorney, Agent, or Firm—Burns, Doane, Swecker & Mathis, L.L.P.

(57) ABSTRACT

A radio signal that has been received from a channel is equalized by estimating the channel, generating an initial estimate of a DC-offset that has been introduced into the radio signal, and estimating a variance of the initial estimate of the DC-offset. The channel estimate, the initial estimate of the DC-offset and the estimated variance are then used to determine a most likely symbol represented by the radio signal. The initial estimate of the DC-offset that has been introduced into the radio signal may be determined from a training sequence portion of the received signal and a reference training sequence signal. For example, a least squares technique may be used to generate the DC-offset as well as the channel estimate and the variance of the initial estimate of the DC-offset. In an equalizer section, the DC-offset and variance values are taken into consideration when the most likely symbol represented by the radio signal is decided.

10 Claims, 6 Drawing Sheets

EQUALIZATION WITH DC-OFFSET COMPENSATION

BACKGROUND

The present invention relates to radio communication technology, and more particularly to apparatuses and techniques for compensating for DC-offsets and low frequency distortion introduced in a radio receiver.

Modem telecommunications systems, such as cellular telecommunications systems, rely on digital technology for the representation and transmission of information, such as audio information. Any of a number of modulation techniques are used to impose the digital information onto a radio frequency signal, which is then transmitted from a sender's antenna, and which is received by a receiver's antenna. Ideally, the receiver would merely perform a reverse of the modulation process to recover the digital information from the received signal.

In practice, however, the transmitted signal is often distorted by the channel (i.e., the air interface) between the transmitter's antenna and the receiver's antenna. For example, a main ray of a transmitted signal may take a direct route between the transmitting and receiving antennas, but other rays may take indirect routes, such as reflecting off of various objects (e.g, buildings, mountains) in the environment prior to being received by the receiver's antenna. This effect is often called "multipath propagation" of the signal. These indirect paths can take longer for the signal to traverse than the direct path. Consequently, signals representing the same information may arrive at the receiver at different times. The various paths between the transmitter and the receiver subject the signal to varying amounts of attenuation, so they are not all received at the same signal strength. Nonetheless, they are typically received at sufficiently high power levels to cause an effect wherein, at any moment, a received signal includes a present signal (representing a present piece of desired information) plus one or more delayed components from previously transmitted signals (each representing an earlier piece of information). This type of signal distortion is often called Inter-Symbol Interference (ISI).

To counteract ISI, a receiver typically employs an equalizer, which demodulates the signal in a way that utilizes a model of the channel (also referred to as an "estimate" of the channel). The channel estimate is typically generated from another component in the receiver, called a channel estimator. A channel estimator relies on a received signal including a portion, often called a "training sequence", that contains a predefined sequence of 1's and 0's known to have been transmitted by the transmitter. By comparing an actually received training sequence portion of a signal with an expected training sequence, the channel estimator is able to construct a model of the channel that can be used by the equalizer when it attempts to demodulate a portion of the received signal that includes unknown information.

FIG. 1 is a block diagram of a conventional channel estimator and channel equalizer for use in a burst transmission system such as, for example, the Global System for Mobile communication (GSM) system. A received radio signal is down-converted to a baseband signal 101 by circuitry in a radio receiver (not shown). The baseband signal 101, which has a predefined burst length, is supplied to a memory 103, where it is stored. A synchronization unit 105 identifies that portion of the stored received signal that corresponds to the training sequence, and supplies these samples to a channel estimator 107. The channel estimator 107 computes the K:th order channel filter taps $\{h_i\}$, (i=0, K) from the received signal while referring to a reference training sequence signal 102. The number of channel taps, K, is application specific, and will generally be specified based on the maximum expected delay spread for the received radio signal. The channel filter taps are then supplied to an equalizer 109, which may for example, be a Viterbi equalizer having $M^K$ states, where M is the number of possible symbols. The equalizer 109 then uses the channel estimate to demodulate those portions of the received baseband signal (as supplied by the memory 103) that correspond to unknown information. The output of the equalizer 109 are the decided symbols 111.

The conventional channel estimator 107 and equalizer 109 as described above assume that the baseband signal 101 does not contain a DC-offset or low frequency distortion. "Low frequency" in this context is defined as a signal whose rate of change is slow compared to the dynamics of the radio channel and the rate of the transmitted information (e.g., the low frequency distortion is relatively constant over the span of two transmitted symbols). However, many types of radio receivers, especially homodyne receivers, introduce DC-offsets. These arise from, for example, component mismatch in the receiver in-phase (I) and quadrature phase (Q) paths; the signal from the local oscillator leaking into the antenna and becoming downconverted to DC or slowly varying DC in the mixers; or a large near-channel interfering signal leaking into the local oscillator and self-downconverting to a varying DC offset. The presence of DC-offsets and low frequency distortion in the signal supplied to the conventional equalizer 109 results in degraded performance, as measured by the accuracy with which the received signal is decoded.

The German patent document DE 196 06 102 A1, published on Aug. 21, 1997, suggests a method for compensating for a DC-offset in an equalizer by introducing a DC-tap in the channel model. However, this method cannot take care of low frequency distortion because it assumes a pure DC component, that is, the DC-tap is constant during the entire burst.

Thus, there is a need for a channel estimator and equalizer that explicitly take into account both the DC-offset and the low frequency distortion introduced in the radio receiver.

SUMMARY

The foregoing and other objects are achieved in methods and apparatuses for equalizing a radio signal that has been received from a channel. In accordance with one aspect of the invention, equalizing the radio signal comprises estimating the channel; generating an initial estimate of a DC-offset that has been introduced into the radio signal; estimating a variance of the initial estimate of the DC-offset; and using the channel estimate, the initial estimate of the DC-offset and the estimated variance to determine a most likely symbol represented by the radio signal.

In another aspect of the invention, the operation of generating the initial estimate of the DC-offset that has been introduced into the radio signal comprises using a training sequence portion of the received signal and a reference training sequence signal to generate the initial estimate of a DC-offset that has been introduced into the radio signal.

In still another aspect of the invention, the operations of estimating the channel, generating the initial estimate of the DC-offset and estimating the variance of the initial estimate of the DC-offset are performed by using a Least Squares technique to determine the channel estimate, the initial estimate of the DC-offset and the variance of the initial estimate of the DC-offset from a training sequence portion of the received signal and a reference training sequence signal.

In yet another aspect of the invention, the operation of using the channel estimate, the initial estimate of the DC-offset and the estimated variance to determine the most likely symbol represented by the radio signal comprises determining a plurality of possible DC-offset values based on a model of DC-offset variation; for each possible transition from a state i to a state j in a decoding trellis, determining a plurality of first metric values in correspondence with the plurality of possible DC-offset values; determining which one of the plurality of possible DC-offset values corresponds to a best one of the plurality of first metric values, and selecting said one of the plurality of possible DC-offset values as an optimal DC-offset value; using the optimal DC-offset value to determine an accumulated metric associated with the transition from state i to state j; finding a lowest accumulated metric associated with a best path through the decoding trellis to state j; and determining the most likely symbol represented by the radio signal based on the lowest accumulated metric associated with the best path through the decoding trellis to state j.

In still another aspect of the invention, the operation of using the channel estimate, the initial estimate of the DC-offset and the estimated variance to determine the most likely symbol represented by the radio signal comprises determining a plurality of possible DC-offset values based on a model of DC-offset variation; and using a delayed decision feedback sequence estimation technique to determine the most likely symbol represented by the radio signal, wherein the delayed decision feedback sequence estimation technique determines a metric that is based, in part, on the plurality of possible DC-offset values.

BRIEF DESCRIPTION OF THE DRAWINGS

The objects and advantages of the invention will be understood by reading the following detailed description in conjunction with the drawings in which.

DETAILED DESCRIPTION

Figure 1:
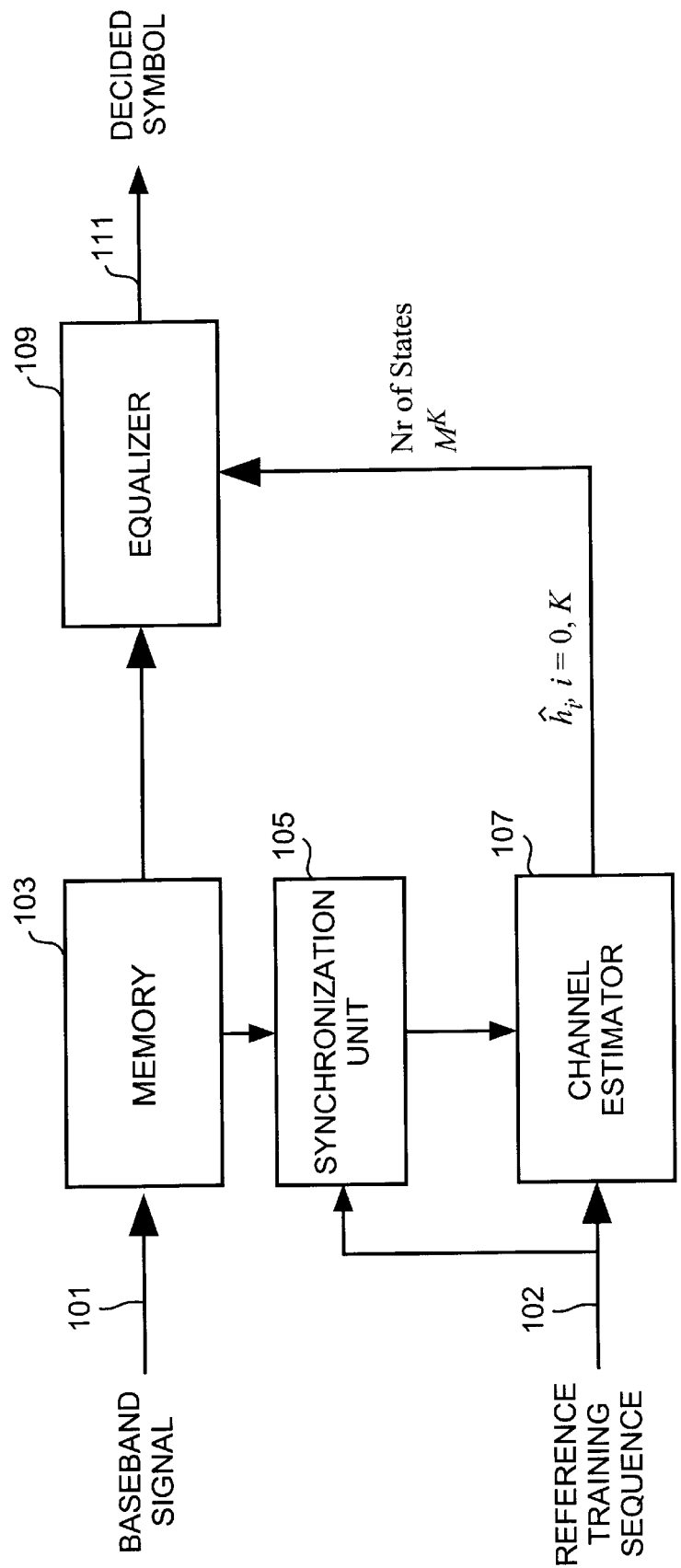
FIG. 1 is a block diagram of a conventional channel estimator and channel equalizer for use in a burst transmission system.

The various features of the invention will now be described with respect to the figures, in which like parts are identified with the same reference characters.

In accordance with the invention, a channel estimator and equalizer are provided that estimate and compensate for DC-offsets and low frequency distortion introduced in the radio receiver. By explicitly using the channel estimator and equalizer to take care of the DC-offsets and low frequency distortion generated in the radio receiver, the bit error rate is significantly lower than bit error rates associated with conventional equalization methods. This is especially the case for moderate to high signal to noise (or carrier to interference) ratios. Further, the complexity of the inventive techniques are only marginally increased compared to conventional equalization methods.

Figure 2:
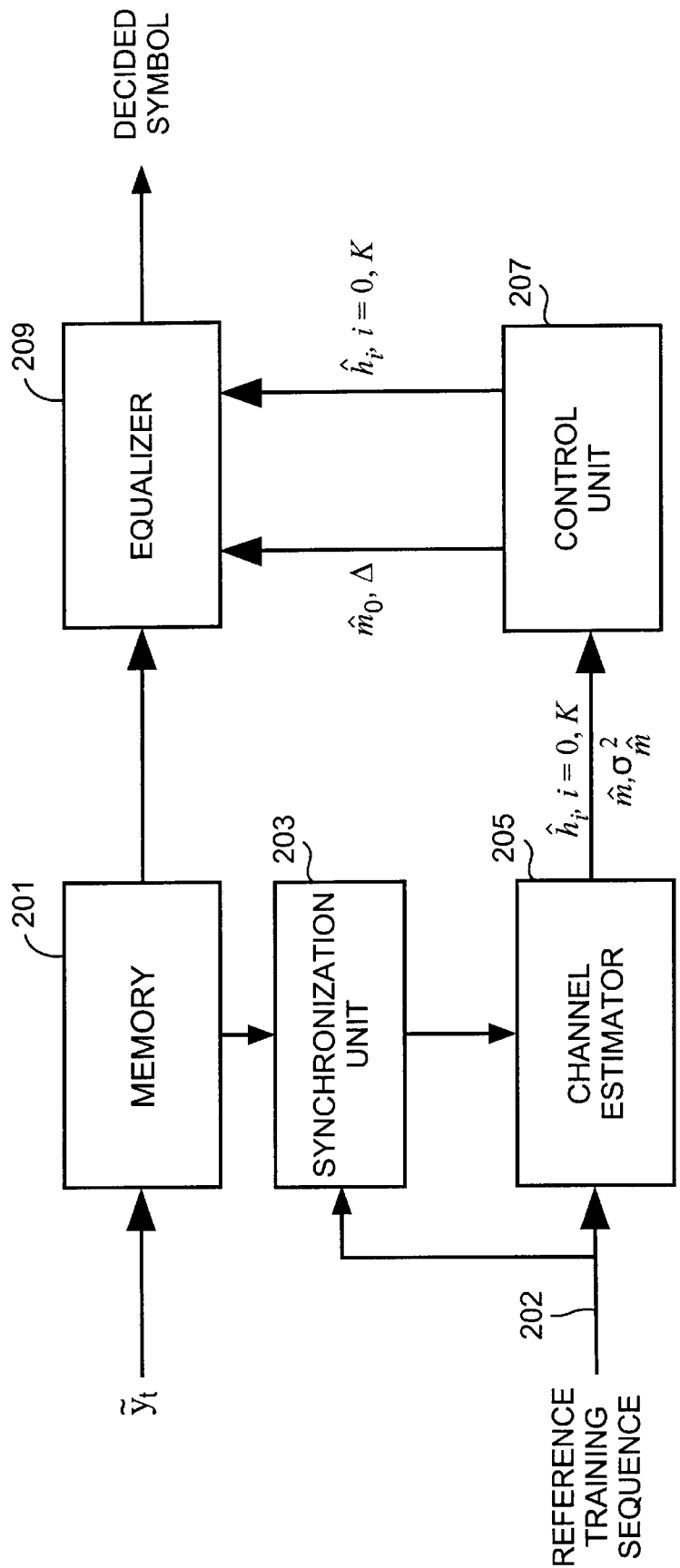
FIG. 2 is a block diagram of an exemplary embodiment of an apparatus for equalizing a received signal in accordance with the invention.

An exemplary embodiment of the invention is depicted in FIG. 2. The various boxes represent functions that could be implemented in any of a number of different ways, including but not limited to hard-wired logic, and one or more programmable processors executing suitable program instructions stored in a memory device.

Referring now to FIG. 2, a baseband signal, $\tilde{y}$, $t=1,2,\ldots,N$ (where N is a predefined burst length) is supplied as an input, where:

$\tilde{y}_t = t_t + m_t$;

$y_t$ = desired signal; and $m_t$ = unknown low frequency distortion introduced in the radio receiver. The baseband signal, $\tilde{Y}$, is supplied to a memory 201, where it is stored. A synchronization unit 203 identifies that portion of the stored received signal that corresponds to the training sequence, and supplies these samples to a channel estimator 205. A reference training sequence signal 202 is also supplied to the channel estimator 205. The channel estimator 205 estimates the radio channel and also generates an initial estimate of the low frequency distortion (including DC-offset), based on the reference training sequence signal 202 and the received training sequence samples. For example, assume that the channel can be modeled by a K:th order FIR filter. The complete model of the radio channel and the offset introduced in the radio receiver can then be written as $$\hat{y}_t = h_0 d_t + \ldots + h_K d_{t-K} + m_t$$

where $\hat{y}_t$ is the predicted value of $\hat{y}_t$, $d_i$ is the unknown transmitted symbol at time i, and $h_0, \ldots, h_K$ are the radio channel taps. The channel estimator 205 generates estimates of the radio channel taps, designated $\hat{h}_0, \ldots, \hat{h}_K$, along with an initial estimate, $\hat{m}$, of the DC offset, $m_0$, this initial estimate being an estimate of the mean value of $m_t$. The channel estimator 205 may, for example, use the well-known Least Squares method to generate these estimates.

In addition to the estimate of the channel taps and the initial estimate of the low frequency distortion, the channel estimator also determines the variance of the offset estimate, $\sigma_{\hat{m}}^2$, using well-known techniques. These three estimates (i.e., $\hat{h}_i$, $\hat{m}$, and $\sigma_{\hat{m}}^2$) are then supplied to a control unit 207. The control unit 207 determines a suitable model for the offset variation, based on the supplied parameters $\hat{m}$ and $\sigma\hat{m}^2$. For example, the offset variations can be modeled by an integrator model given by:

$$\hat{m}_t = \hat{m}_{t-1} + \Delta_t \Delta_t = \{\alpha_i\}, i=1, \ldots, L\hat{m}_0 = \hat{m}\alpha_i = f(\hat{m}, \sigma_m^2). \quad (1)$$

As can be seen from Eq. (1), values for ac, are generated as a function of $\hat{m}$ and $\sigma_{\hat{m}}^2$. That is, given the mean value of the DC-offset and the variance, estimates of the low and high values can be determined. The complete set of values for $\alpha_i$ is then formed from these extreme values and a set of values falling in between.

Alternative forms of the offset variation model may be used as well. For example, one might use the more general model:

$$\hat{m}_t = a_1 \hat{m}_{t-1} + a_2 \hat{m}_{t-2} + \ldots + a_W \hat{m}_{t-W} + \Delta_t$$

(with W being a predetermined integer). It will be observed that this model reduces to that given by Eq. (1) when W=1 and α=1.

The estimated channel taps, $\hat{h}_j$, together with the DC-offset model information are fed to an equalizer 209. In accordance with one aspect of the invention, operation of the equalizer 209 includes steps that compensate for both the DC-offset and the low frequency distortion introduced into the received signal by the radio. Nonetheless, the equalizer 209 may fundamentally operate in accordance with any of a number of known equalization techniques, such as those used by Maximum Likelihood Sequence Estimation (MLSE) Viterbi equalizers, or Delayed Decision-Feedback Sequence Estimators (DFSE).

The number of states in the equalizer 209 having DC-offset and low frequency distortion compensation is the same as in a conventional equalizer. For example, for a full MLSE, the number of states is $M^K$, where M is the number of possible symbols, and K is the channel filter length. Each state in the equalizer 209 includes a memory that, at time t, contains the best estimate of $m_t$ for that state.

Figure 3A:
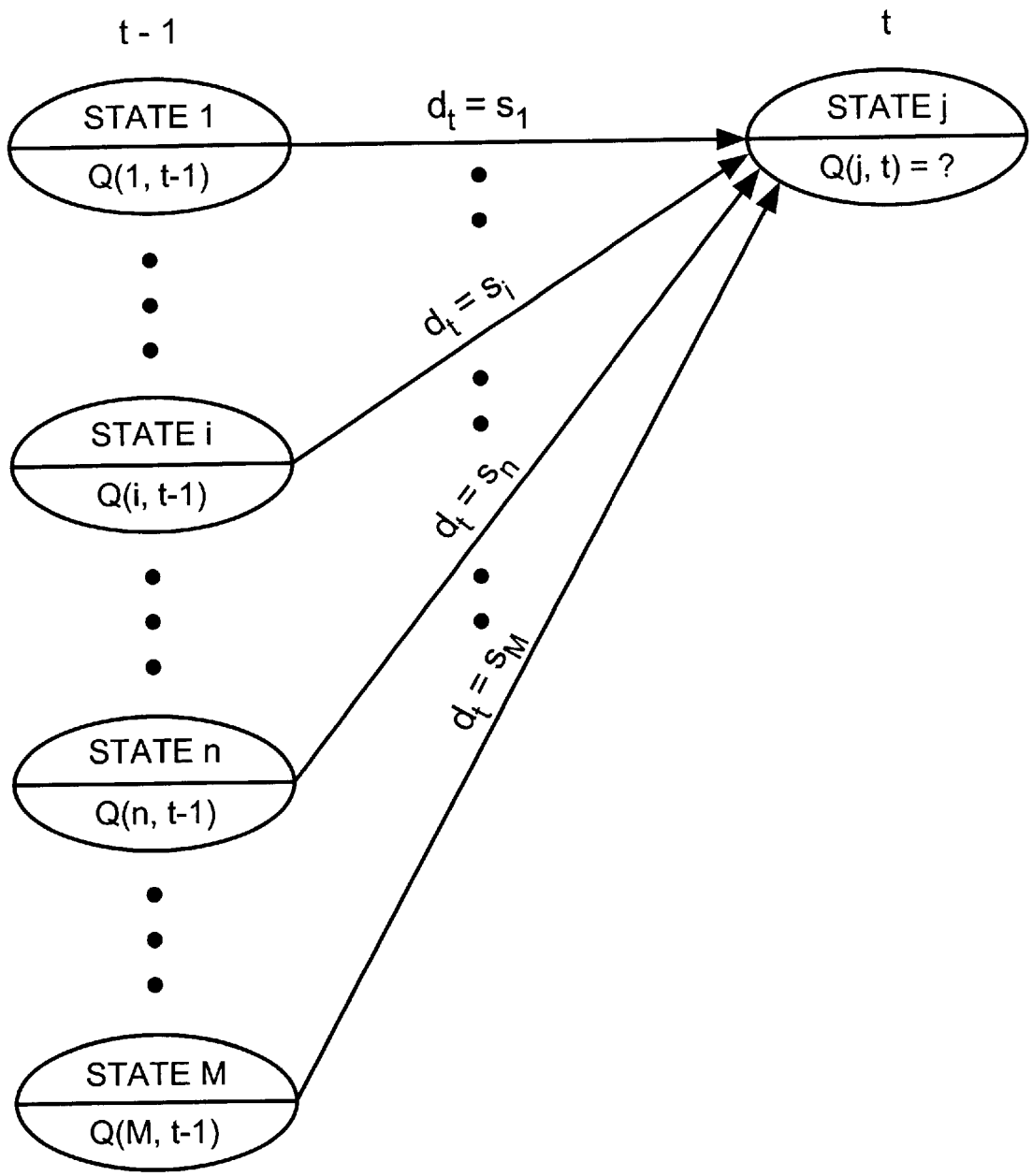
FIGS. 3a–3b show decoding trellis state transitions in accordance with conventional techniques.
Figure 3B:
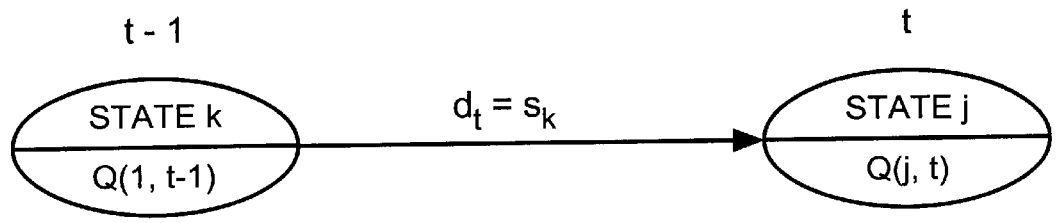

The equalizer 209 differs from a conventional equalizer in that the number of transitions between any two states i and j is L for the equalizer 209 instead of just one for a conventional equalizer. FIGS. 3a–3b show decoding trellis state transitions in accordance with conventional techniques. In FIG. 3a, the M states at time t−1 are shown along with their corresponding accumulated metrics, $Q(1, t-1) \ldots Q(M, t-1)$. For each of the illustrated states at time t−1, there is only a single way of transitioning to State j (at time t). The object, then, is to determine which of these M possible transitions results in a lowest accumulated metric at time t. This is illustrated in FIG. 3b by showing that the transition from State k at time t−1 to State j at time t resulted in a lowest accumulated metric, $Q(j, t)$. It can also be seen from the figure that the data symbol corresponding to this transition is $d_t = s_k$.

In contrast to the prior art approach, the inventive equalizer 209 has a number of transitions from each of the M states to State j in correspondence with the number of possible transitions defined by the DC-offset variation model (given, for example, by Eq. (1)).

An exemplary equalizer 209 will now be described in greater detail with reference to the flowchart of FIG. 4. The exemplary equalizer algorithm follows the idea of a standard Viterbi equalizer, but includes a number of modifications to the conventional approach in order to account for DC-offset and low frequency distortion.

At step 401, the DC-Offset variation model within the equalizer 209 is initialized. This means setting initial values for $\hat{m}_0$ and $\Delta_0$. In the exemplary embodiment, these values are supplied to the equalizer 209 by the control unit 207. It will be recalled that these values are generated in accordance with Eq. (1). At step 402, an initial value for t is set, and at step 403 an initial value for j is set. Then, at step 404, an initial value for i is set. These parameters (i, j and t) are used as indices in subsequent steps. The index i will vary to cover all states with possible transitions to state j.

At step 405, a value for $\Delta_t$ that yields the best transition (i.e., the transition with the lowest metric) between state i and state j, is computed in accordance with:

$$\Delta_t^{opt_{i,j}} = \arg \min_{\Delta_t \in \{\alpha_1, \ldots, \alpha_L\}} (\tilde{y}_t - \hat{y}_t^{i,j} - \Delta_t)^2$$

where $\hat{y}_t^{ij}$ corresponds to the predicted output given state i and transition from state i to state j. More particularly, $$\hat{y}_t^{i,j} = \sum_{l=0}^{K} h_l d_{t-l}^{i,j} + \hat{m}_{i,t-1}^{opt}$$

where $d_{t-1}^{ij}$ refers to those symbols corresponding to state i transitioning from state i to j.

At step 407, the accumulated metric, B(i,j,t), for this best transition is saved as follows:

$$B(i,j,t) = Q(i, t-1) + (\tilde{y}_t - \hat{y}_t^{i,j} - \Delta_t^{opt_{ij}})^2$$

where Q(i,t−1) is the accumulated metric at time t−1 for state i. For an initial value, Q(i,0)=0.

At step 409, another value for the index i is selected, and the loop comprising steps 405, 407 and 409 is repeated until all possible values of i have been used.

Next, at step 411, the lowest accumulated metric for state j is found according to:

$$Q(j,t) = \min_i B(ij, t).$$

Then, at step 413, a value for $\hat{m}_{j,t}^{opt}$ is determined in accordance with:

$$\hat{m}_{j,t}^{opt} = \hat{m}_{k,t-1}^{opt} + \Delta_t^{opt_{k,j}}.$$

Here, k represents the state that results in the best transition (i.e., the transition resulting in the lowest accumulated metric) to State j at time t.

At step 415, another value for the index j is selected and the loops comprising steps 404, 405, 407, 409, 411, 413 and 415 are repeated until all possible values of j have been used.

Then, at step 417, another value for the index t is selected, and the loops comprising steps 403, 404, 405, 407, 409, 411, 413, 415 and 417 are repeated until all possible values of t have been used.

Finally, at step 419, the path through the trellis having the lowest accumulated metric is found. This path identifies the maximum likelihood (ML) estimate of the transmitted symbol sequence, which is then output from the equalizer 209.

Figure 5A:
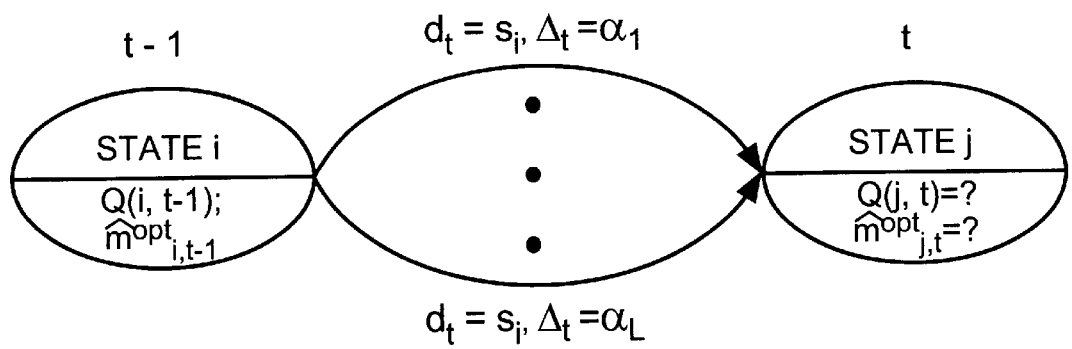
FIGS. 5a–5c show exemplary decoding trellis state transitions in accordance with one aspect of the invention.
Figure 5C:
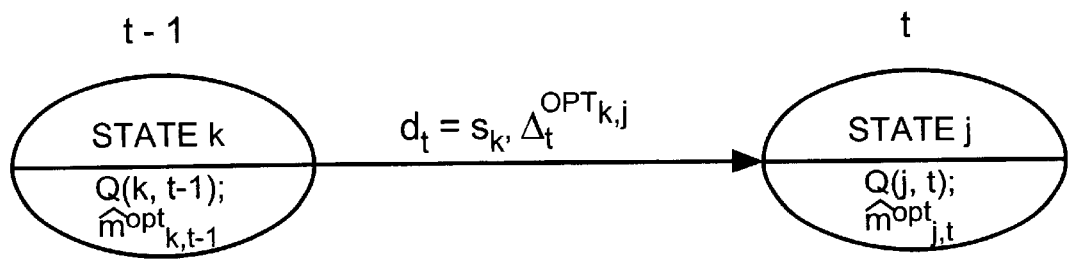
Figure 5B:
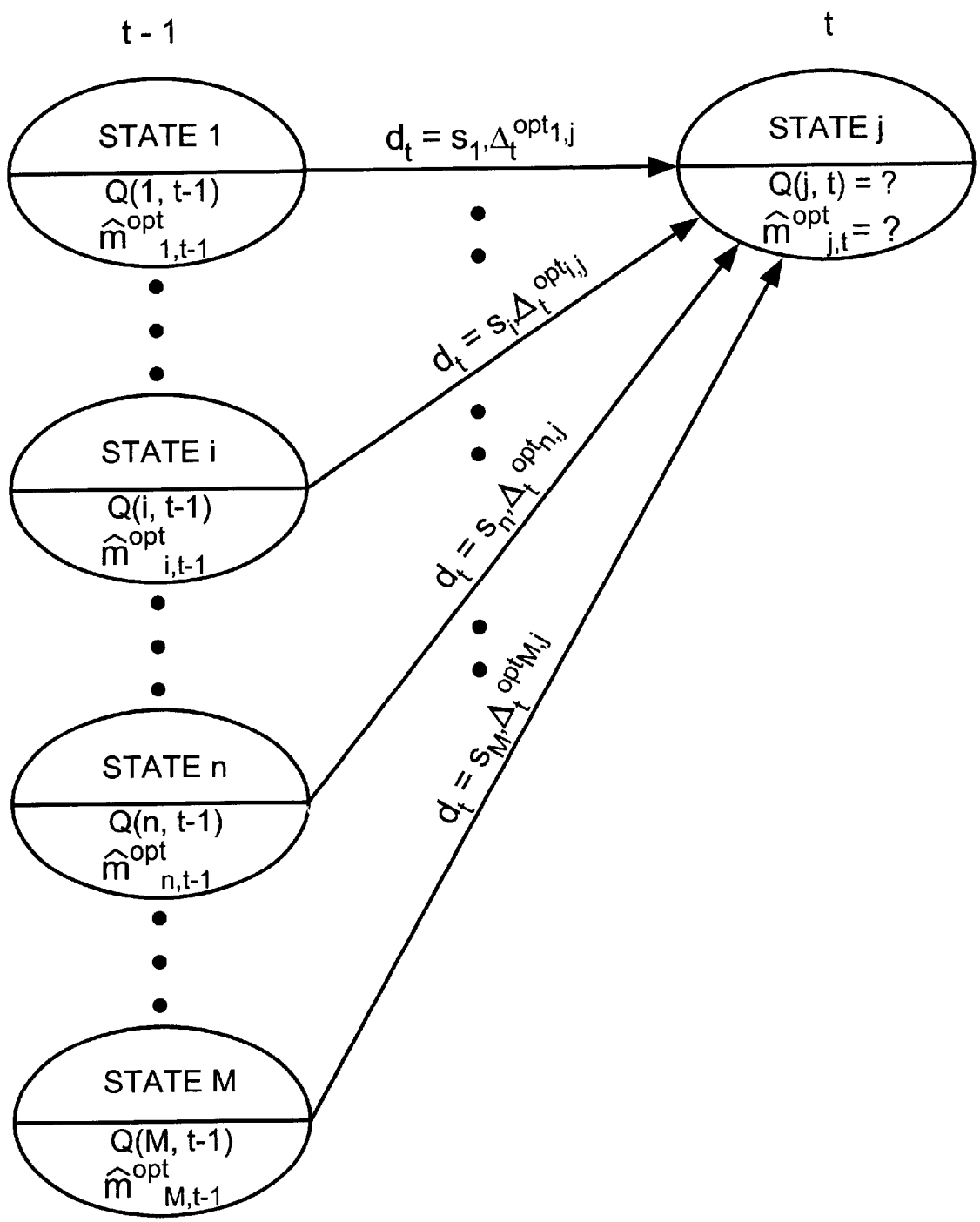

To further illustrate the inventive techniques, FIGS. 5a–5c show exemplary decoding trellis state transitions in accordance with the invention. In FIG. 5a, the transitions from an exemplary State i at time t−1 to a State j at time t are shown. It can be seen that it is desired to determine, for State j, an optimal value for $\hat{m}_{j,t}^{opt}$ in addition to an accumulated metric Q(j, t). Because there are L possible values of DC offset increments (represented by $\Delta_t$), L candidates for $\hat{m}_{j,t}^{opt}$ are generated. Note that the same symbol, $d_t = s_i$, is associated with each of these L possible transitions.

Figure 4:
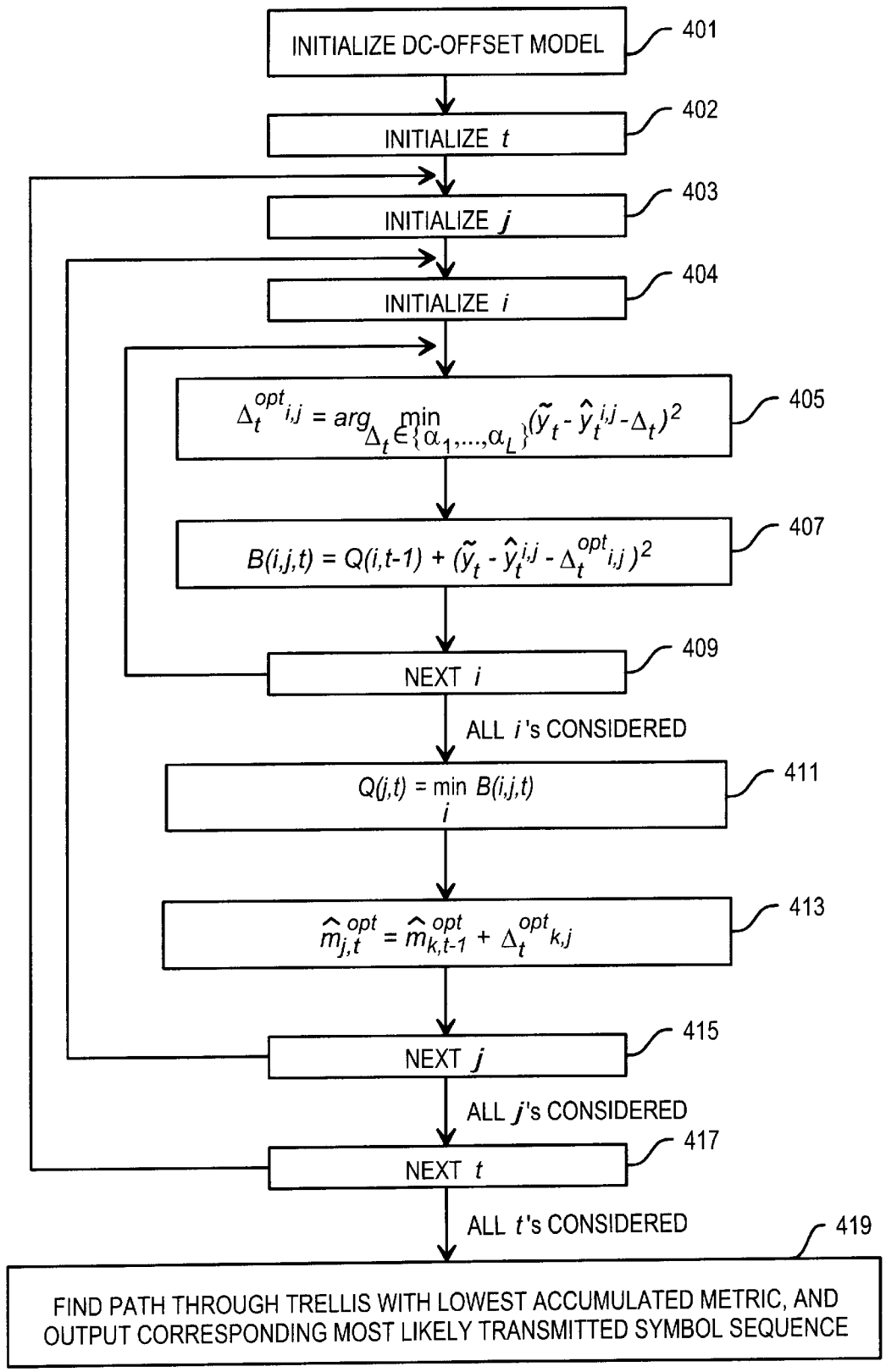
FIG. 4 is a flowchart depicting steps performed by an exemplary embodiment of an equalizer in accordance with an aspect of the invention.

Having determined the L candidates of DC offset increment values, that candidate is selected which minimizes the metric shown in block 405 of FIG. 4. This optimal DC offset increment value is designated $\Delta^{opt_{ij}}$, for the transition from State i to State j.

As illustrated in FIG. 5b, optimal DC offset increment values are determined for each of the M possible state transitions to State j at time t.

Once these are determined, the transition resulting in the lowest accumulated metric can then be found. This is illustrated in FIG. 5c for an exemplary best transition from State k at time t−1 to State j at time t.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of equalizing a radio signal that has been received from a channel, comprising the steps of:

estimating the channel;

generating an initial estimate of a DC-offset that has been introduced into the radio signal;

estimating a variance of the initial estimate of the DC-offset; and using the channel estimate, the initial estimate of the DC-offset and the estimated variance to determine a most likely symbol represented by the radio signal.

2. The method of claim 1, wherein the step of generating the initial estimate of the DC-offset that has been introduced into the radio signal comprises the step of using a training sequence portion of the received signal and a reference training sequence signal to generate the initial estimate of the DC-offset that has been introduced into the radio signal.

3. The method of claim 1, wherein the steps of estimating the channel, generating the initial estimate of the DC-offset and estimating the variance of the initial estimate of the DC-offset are performed by using a Least Squares technique to determine the channel estimate, the initial estimate of the DC-offset and the variance of the initial estimate of the DC-offset from a training sequence portion of the received signal and a reference training sequence signal.

4. The method of claim 1, wherein the step of using the channel estimate, the initial estimate of the DC-offset and the estimated variance to determine the most likely symbol represented by the radio signal comprises the steps of:

determining a plurality of possible DC-offset values based on a model of DC-offset variation;

for each possible transition from a state i to a state j in a decoding trellis, determining a plurality of first metric values in correspondence with the plurality of possible DC-offset values;

determining which one of the plurality of possible DC-offset values corresponds to a best one of the plurality of first metric values, and selecting said one of the plurality of possible DC-offset values as an optimal DC-offset value;

using the optimal DC-offset value to determine an accumulated metric associated with the transition from state i to state j;

finding a lowest accumulated metric associated with a best path through the decoding trellis to state j; and determining the most likely symbol represented by the radio signal based on the lowest accumulated metric associated with the best path through the decoding trellis to state j.

5. The method of claim 1, wherein the step of using the channel estimate, the initial estimate of the DC-offset and the estimated variance to determine the most likely symbol represented by the radio signal comprises the steps of:

determining a plurality of possible DC-offset values based on a model of DC-offset variation; and using a delayed decision feedback sequence estimation technique to determine the most likely symbol represented by the radio signal, wherein the delayed decision feedback sequence estimation technique determines a metric that is based, in part, on the plurality of possible DC-offset values.

6. An equalizer for equalizing a radio signal that has been received from a channel, comprising:

a channel estimator;

means for generating an initial estimate of a DC-offset that has been introduced into the radio signal;

means for estimating a variance of the initial estimate of the DC-offset; and means for using the channel estimate, the initial estimate of the DC-offset and the estimated variance to determine a most likely symbol represented by the radio signal.

7. The equalizer of claim 6, wherein the means for generating the initial estimate of the DC-offset that has been introduced into the radio signal comprises means for using a training sequence portion of the received signal and a reference training sequence signal to generate the initial estimate of the DC-offset that has been introduced into the radio signal.

8. The equalizer of claim 6, wherein the channel estimator, the means for generating the initial estimate of the DC-offset and the means for estimating the variance of the initial estimate of the DC-offset are performed by a unit that uses a Least Squares technique to determine the channel estimate, the initial estimate of the DC-offset and the variance of the initial estimate of the DC-offset from a training sequence portion of the received signal and a reference training sequence signal.

9. The equalizer of claim 6, wherein the means for using the channel estimate, the initial estimate of the DC-offset and the estimated variance to determine the most likely symbol represented by the radio signal comprises:

means for determining a plurality of possible DC-offset values based on a model of DC-offset variation;

means for determining, for each possible transition from a state i to a state j in a decoding trellis, a plurality of first metric values in correspondence with the plurality of possible DC-offset values;

means for determining which one of the plurality of possible DC-offset values corresponds to a best one of the plurality of first metric values, and selecting said one of the plurality of possible DC-offset values as an optimal DC-offset value;

means for using the optimal DC-offset value to determine an accumulated metric associated with the transition from state i to state j;

means for finding a lowest accumulated metric associated with a best path through the decoding trellis to state j; and means for determining the most likely symbol represented by the radio signal based on the lowest accumulated metric associated with the best path through the decoding trellis to state j.

10. The equalizer of claim 6, wherein the means for using the channel estimate, the initial estimate of the DC-offset and the estimated variance to determine the most likely symbol represented by the radio signal comprises:

means for determining a plurality of possible DC-offset values based on a model of DC-offset variation;

a delayed decision feedback sequence estimator that determines the most likely symbol represented by the radio signal, wherein the delayed decision feedback sequence estimator determines a metric that is based, in part, on the plurality of possible DC-offset values.

* * * * *